United States Patent [19]

Strauss et al.

[11] Patent Number: 5,650,836
[45] Date of Patent: Jul. 22, 1997

[54] HANGER WITH TEMPLE SUPPORT FOR DISPLAY OF EYEGLASSES

[75] Inventors: Kurt Strauss, Harrington Park; Helmut Strauss, Closter, both of N.J.

[73] Assignee: Hudson Universal Ltd., Englewood, N.J.

[21] Appl. No.: 675,379

[22] Filed: Jul. 2, 1996

[51] Int. Cl.$^6$ .................................................. G02C 1/00
[52] U.S. Cl. .............................. 351/158; 351/41; 206/5
[58] Field of Search ....................... 351/158, 41; 248/214, 248/215; 206/5, 486, 806; 211/13

[56] References Cited

U.S. PATENT DOCUMENTS 5,423,505  6/1995  David ................................. 351/158

*Primary Examiner*—Hung X. Dang
*Attorney, Agent, or Firm*—Ostrolenk, Faber, Gerb & Soffen, LLP

[57] ABSTRACT

A hanger for a display of eyeglasses including a central portion and a pair of opposite arms extending down toward the temples of the eyeglasses. A respective temple panel at each arm of the hanger and connected therewith by a hinge permitting the panel to swing with reference to each arm. The panel has a plurality of openings therethrough through which a respective eyeglass temple is threaded, such that the temple panels pivot around the hanger hinges along with the pivoting temples and pivot with respect to the arms of the hanger, while the support panels are out of the planes of the respective arms of the hanger. In one embodiment, the entirety of each arm is the same plane as the central portion. In another embodiment, there is an additional hinge connection part way along each arm, so that the upper part of the arm toward the central portion is generally in the plane of the central portion while the lower portion of the arm is in a plane that intersects both the plane of the central portion and the plane of the fixture panels.

13 Claims, 2 Drawing Sheets

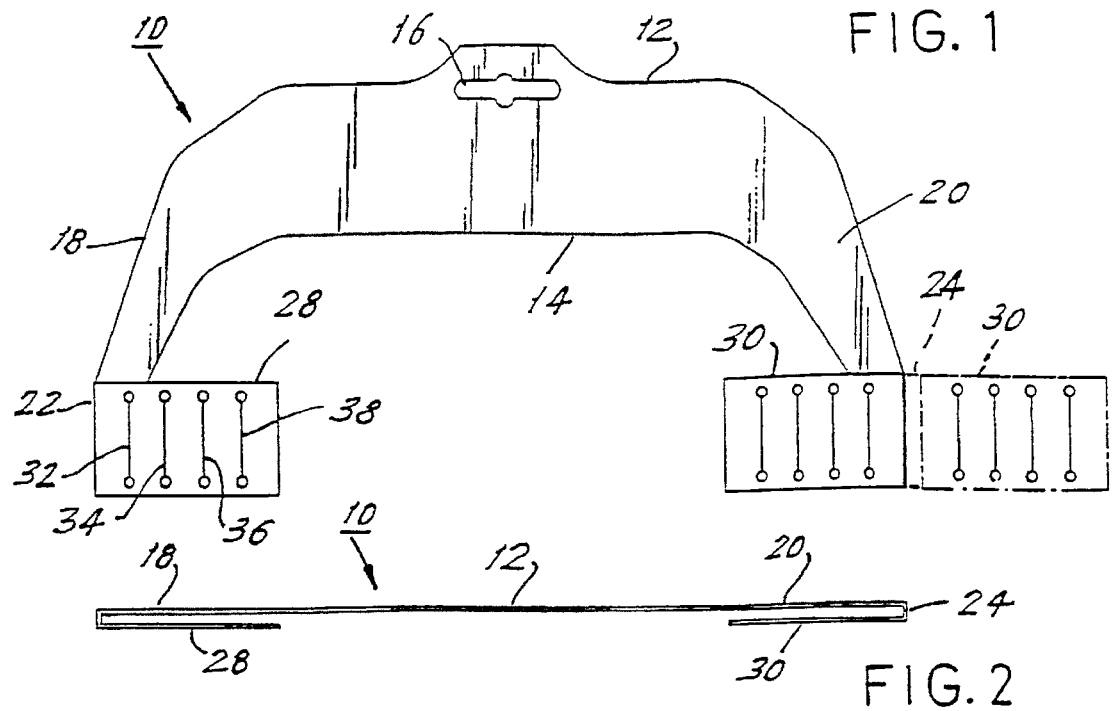
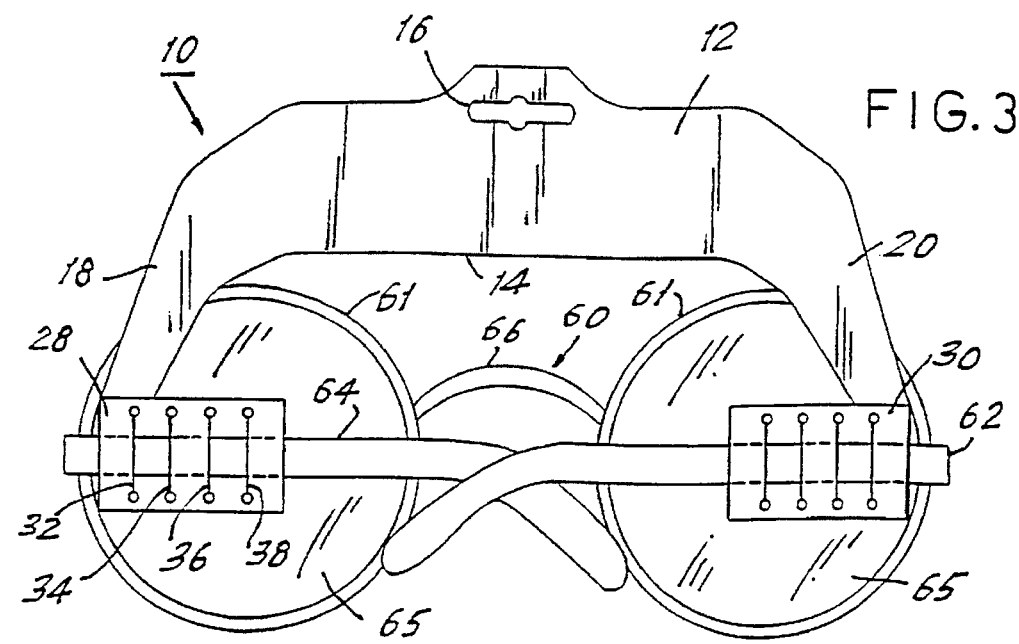
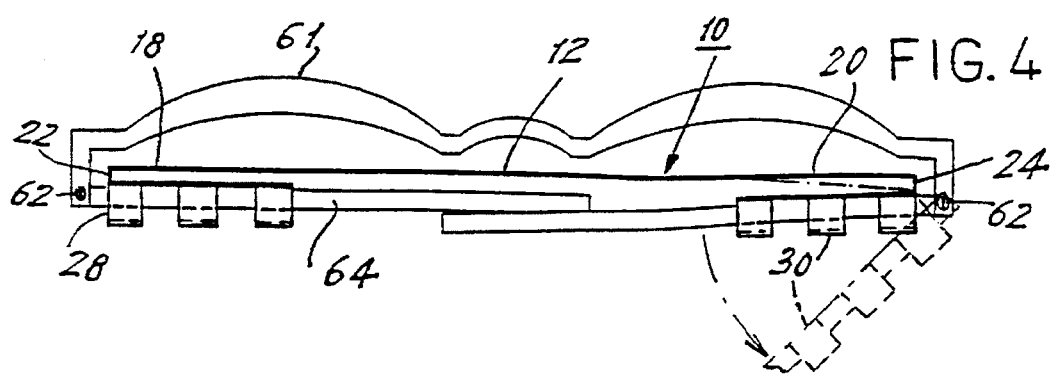

HANGER WITH TEMPLE SUPPORT FOR DISPLAY OF EYEGLASSES

BACKGROUND OF THE INVENTION

The present invention relates to hanger for removably supporting a pair of eyeglasses on a display and for easy use by the user of the pair of eyeglasses while they are on the hanger without having to remove the eyeglasses from the hanger. The hanger is of a type which enables a user to remove the hanger from the display while the hanger supports the eyeglasses and enables the user to try on the eyeglasses while they remain attached to the hanger.

U.S. Pat. No. 4,976,532 discloses an eyeglasses hanger adapted for being supported on a display. The hanger includes a strap that wraps around the nose bridge of the eyeglasses. This hanger may initially be formed of at least two pieces which is thus more expensive to fabricate and assemble than a one piece hanger. Further, the piece on the nose bridge would be annoying to someone who wears the eyeglasses while they are still attached to the hanger.

U.S. Pat. No. 5,141,104 discloses a hanger that includes a central portion that supports two laterally separated, downwardly extending arms with holes through the ends of the arms through which the temples of the eyeglasses are inserted. The central portion, the arms and the end portions are all in one plane and typically are formed of one flat piece of material. However, there may be some difficulties, first in retaining the eyeglasses on the hanger as the temples may slip out of the holes in the arms, secondly in holding the eyeglass temples closed over the eyeglass lenses as the positions of the temples through the holes in the hanger may prevent both temples from being closed over the lenses. Most significantly, when the glasses are tried on, the hanger may prevent the temples being opened completely, because the hanger becomes wedged between the glasses and the temples preventing them from opening to their full designed width. The basic construction of the hanger is that it is placed over the hinge.

A primary purpose of the hanger design is to enable a user to try on the glasses with the glasses still attached to the hanger, and without the hanger having to be removed. Therefore, it is typical to shape the hanger to permit viewing through the lenses of the eyeglasses, while the eyeglasses are supported on the hanger.

SUMMARY OF THE INVENTION

It is the primary object of the invention to provide a hanger for supporting a pair of eyeglasses on a display, to firmly hold the eyeglasses to the hanger, to permit the temples of the eyeglasses to be pivoted between an open position at which the eyeglasses may be worn and a closed position over the lenses, to permit viewing through the lenses while the temples are installed in the hanger, to not have an uncomfortable part of the hanger at the nose bridge of the eyeglasses when the eyeglasses are being tried on and to have the hanger be of simple construction and easy to manufacture and to preferably have the hanger be of a single piece.

Another object of the invention is to provide a hanger for eyeglasses which permits viewing of the eyeglasses from the front side and permits looking through the lenses, without obstruction of view of the eyeglasses caused by the hanger.

The hanger of the invention has a central portion including means by which the hanger is supported on a display. For example, the central portion may have an opening through it which is shaped for receiving a support element on the display, e.g. a rod or a pair of rods, or the like, so that the hanger can be slid along the support element for installation on the display, removal from the display or positioning for easy handling and use by a user. Any opening in or fixture of the hanger that supports the hanger on a display may be used. Preferably, the opening or fixture is centrally located across the hanger so as to keep the eyeglasses balanced and avoid tilting of the eyeglasses or the hanger on the display.

A pair of side arms project away from the opposite lateral ends of the central portion and extend toward support fixtures, and particularly panels, that are formed on the free ends of the side arms. The central portion has a lower edge that is typically raised above where the top of the eyeglass lenses would likely be, so that the central portion does not interfere with a wearer looking through the lenses. The central portion is wide enough so that the arms at the ends of the central portion project downwardly, and the arms at most minimally interfere with viewing through the lenses.

At the end of each arm, there is a support fixture for the respective eyeglass temple. That fixture includes a panel having at least one and more typically at least one pair of openings through it, through which the temple is passed. The panel has a characteristic that before the temple is installed in the opening(s) in the panel, the panel is pivoted out of the plane of both the central portion and the arms, so that the panel extends in the direction of extension of the temple, that is, it is in the plane of the temple. Then the temple is passed through the openings, so that the temple is supported by the panel.

A hinge connection between the panel and the respective arm in one embodiment and within the arm as well as at the panel in another embodiment permits the panel to swing or pivot around the hinge(s) as the temple is selectively opened away from the lens to the position where the wearer could wear the eyeglasses or closed toward the lens, which is the typical storage position for the temples. Because the eyeglass temples are behind the lenses and the arms of the hanger are between the lenses and the temples, each panel is in a second plane to the rear of the plane of both of the central portion and the arms, and the hinge is sized and shaped to permit the panel to be in the second plane.

Other features and advantages of the present invention will become apparent from the following description of the invention which refers to the accompanying drawings.

BRIEF DESCRIPTION OF THE DRAWINGS

FIG. 1 is an elevational view of a first embodiment of a hanger according to the invention;

FIG. 2 is a top view of the hanger;

FIG. 3 is a rear view of the hanger with a pair of eyeglasses installed on the hanger;

FIG. 4 is a top view of the hanger with the installed eyeglasses;

DETAILED DESCRIPTION OF THE PREFERRED EMBODIMENT

Figure 5:
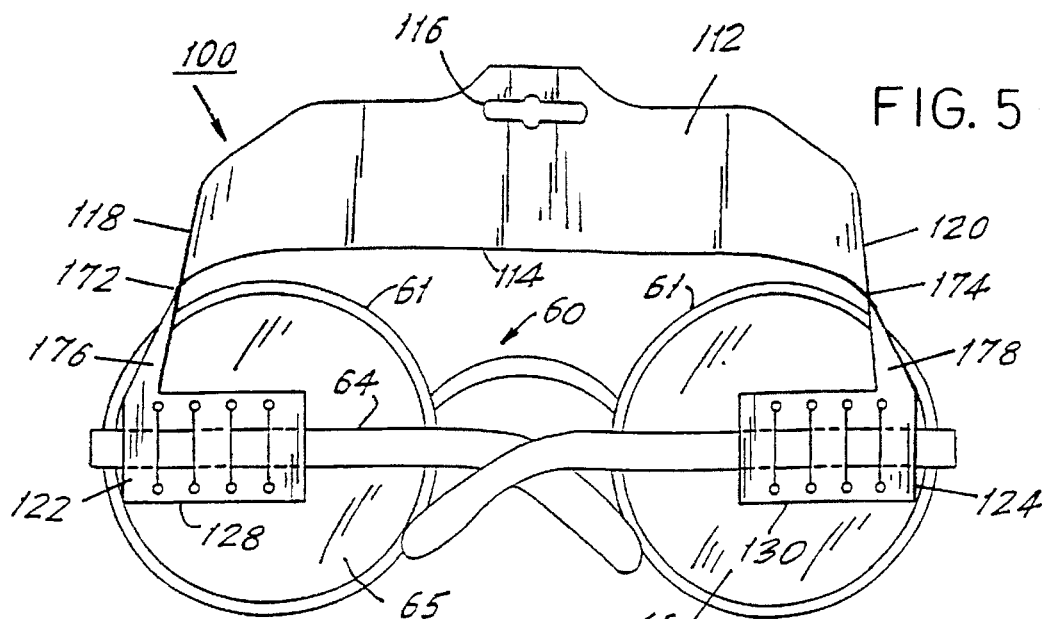
FIG. 5 is a rear elevational view of another embodiment with eyeglasses installed.

As can be seen in FIG. 3, the eyeglasses 60 with which the hanger of the invention is used have lens frames 61 and a respective hinge 62 between the lens frame and each of the temples 64. A respective lens 65 is supported in each lens frame. A nose bridge 66 between the frames 61 completes the eyeglasses. The hanger of the invention does not wrap around the nose bridge, so that the hanger does not interfere with a user placing the eyeglasses on the bridge of his nose.

The hanger 10 of a first embodiment of the present invention may be formed from a single stamped piece of material which is initially flat and planar and is thin in its thickness dimension, as can be seen in FIG. 2. For example, it may be formed from a sufficiently stiff plastic material, or may be formed from cardboard or other material of sufficient strength, flexibility and resiliency to have the features of the invention. The nature of the material of the hanger and the thickness of its elements are selected to be thick enough and strong enough as to not bend when the hanger is supporting a pair of eyeglasses, except that the hanger is flexible enough to bend at the below described hinge 22, 24 and also over the below described temple fixture panel 28, 30 when the eyeglass temples 64 are installed. Also, the hanger material is resilient and of such strength as to hold and support the eyeglass temples in the below described temple support fixture panels.

The hanger 10 includes a central portion 12 having a lateral width that spans the typical nose bridge of the eyeglasses and a major part of the width of the lenses and the lens surrounding frames 61 of the pair of eyeglasses. The bottom edge 14 of the central portion is above the tops of the frames 61 supported on the hanger. The height of the central portion 12 and the placement of the below described arms 18 and 20 of the hanger provides rear viewing access through the lenses 65 of the eyeglasses held by the frames 61 and also raises the hanger high enough so that it would not prevent the wearer from trying on a pair of the eyeglasses even without removing the hanger.

Means 16 are provided for cooperating with a display (not shown) on which the hanger is installed. The illustrated means 16 comprise an opening through the hanger. That opening will cooperate with a supporting bar, or a pair of bars, or a long and thin loop, all shaped and positioned to fit through the opening 16 so that the hanger can be supported on the display. Other fixtures, like hooks, clips, etc., may be provided with a shape and design to cooperate with the part of the display from which the hanger is to be suspended. The means in the form of the opening 16 is located centrally across the width of the hanger so that the hanger will not tilt on the display.

The lateral ends of the central portion 12 merge into and are integral with respective side arms 18 and 20 which extend down from the lateral ends of the central portion toward the respective eyeglass temple support panels 28, 30. The arms 18 and 20 are of a length so as to keep the bottom edge 14 of the central portion above the top of a normal eyeglass lens and frame, providing maximum ability for the person wearing a pair of the eyeglasses with the hanger in place to be able to look through the lenses without obstruction.

The lower free ends of the side arms 18 and 20 terminate in respective flexible hinges 22, 24 which are integral with the side arms 18, 20. The hinges are sufficiently flexible to bend with the respective below described temples of a pair of eyeglasses, as the temples are swung between their positions of storage and use. The material of the hanger is preferably therefore sufficiently flexible that it bends at the hinges 22 and 24. The plastic material of the hanger can be sufficiently flexible and/or the region of the hinge 22, 24 can be sufficiently thin as to be flexible. Parts of the hinge region may be removed to increase its flexibility. With a cardboard hanger, for example, the material may be sufficiently thin or may be scored or weakened in order to possess the flexibility required of the hinges 22 and 24. Other techniques for forming hinges 22, 24 between the arms 18, 20 and the temple receiving fixtures or panels 28, 30 should be apparent to persons skilled in the art. It is possible for the hinges to be separate elements attached on the one hand to the respective arms 18, 20 on the other hand to the respective panels 28, 30. The provision of extra pieces for hinges would needlessly increase the expense of fabrication and assembly.

The placements of the hinges at the ends of the arms 18, 20 and the beginning of the temple support panels 28 and 30 are selected so that they are slightly laterally in from the typical location of the hinge 62 connecting the temple to the eyeglass frame. That spacing in from the hinge 62 can be seen in the top view in FIG. 4. That spacing generally accommodates the length of the hinge or the spacing between the fixture panel 28, 30 and the respective arm 18 when the eyeglass temples are folded closed as in FIG. 3. Due to variation in the size of eyeglass lenses, it is preferred to have the hinges 22, 24 and the beginning of the panels 28, 30 inward from the respective location of the eyeglass temple hinges 62. Further, it is also possible for the hinges 22, 24 and the panels 28, 30 to be even further out to the sides to where the eyeglass hinges 62 normally might be found as in the second embodiment. If any stress is applied on the panels 28, 30 due to the particular shape or frame widths etc. of the eyeglass frame supported on the hanger the flexibility of the hinges 22, 24 and/or the slight flexibility of the panels 28, 30 and of the arms 18, 20 would absorb any slight deformation of the hanger 10 that might occur.

The hinges 22, 24 are in turn integrated with respective eyeglass supporting fixtures or panels 28, 30 that are formed at the ends of the arms 18, 20 and are intended to receive the eyeglass temples. The fixture panel 28 is described here. The fixture panel 30 is identical. The panel 28 has at least one vertical slit 32 for a temple 64 to pass through and preferably has at least one pair of those slits 32, 34 through which a temple passes. The preferred version shown includes two pairs of the slits 32, 34 and 36, 38. Those slits are of a sufficient height and the material of the panel 28 is of sufficient flexibility but is also sufficiently resilient that when a pair of eyeglasses is installed on the hanger 10, each temple 64 may be threaded through the single slit or the pair of slits 32, 34 or the two pairs of slits 32, 34 and 36, 38 which holds the temple. The material of the panel 28 is sufficiently flexible to be deformed to receive the temple and sufficiently stiff and resilient to hold the temple securely enough that it will not slip out of the panel and stiff enough as to hold the eyeglasses firmly in the upright position with the rear side of the lenses 65 against the hanger. That the temple of the eyeglasses pass through the slits 32–38 causes the panel 28 to normally extend parallel to and be generally in the plane of the respective temple received in the panel. Both the temple and the panel remain in that plane as they are pivoted together between the temple folded closed and opened positions. With the temple in its non-use folded position illustrated in FIGS. 3 and 4 against the back of the lens, the panel 28 stays in that orientation. When the eyeglass temple is swung outward, as illustrated in broken lines in FIG. 4, to a position of use of the eyeglasses, so that the wearer or potential customer might try on the pair of eyeglasses, the respective panel 28 (.30) swings out to the position of use as well and remains parallel and co-planar with the respective temple and securely holds the respective temple, so that the temple should not shift with reference to the panel or the hanger and would not fall out of the hanger. This benefit of the manner of securement of the temple in the panel arises from the temple passing through several slits along that panel.

The panels 28, 30 are at and along the temples. The central portion 12 and arms 18, 20 of the hanger are behind the lens frame and in front of the temples. A wearer can put on the eyeglasses and look through the lenses and look in a mirror and see the full front view of the eyeglasses without the hanger blocking view of the front of the eyeglasses.

The material of the hanger, its color, its decoration, its being transparent or translucent, etc., can be selected so that the hanger will not interfere with someone obtaining an accurate view of the way the supported eyeglasses appear even with the hanger in place.

As illustrated by broken lines in FIG. 1, the hanger 10 may initially be formed as a single flat unit, with the panels 28, 30 extending outwardly with reference to the respective arms 18, 20 and the hinges 22, 24 being unfolded and flat. The entire hanger including the slits may be formed in a single stamping operation, which is economical. However, before the pair of eyeglasses 60 is installed in the hanger, it is necessary that the panels 28, 30 be folded at the respective hinges, 22, 24 to be oriented to receive the temples of the eyeglasses in the slits. Thereafter the panels, 28, 30 remain parallel to or co-planar with the temples and move with the temples around the respective hinges 22, 24 and with reference to the respective arms 18, 20.

In a further embodiment, not shown in the hinges between the arms and the temple support panels may be defined by score lines, and for a cutout region along the score line or hinge reduces the quantity of material there and enables the hinge to be formed and folded there.

Figure 6:
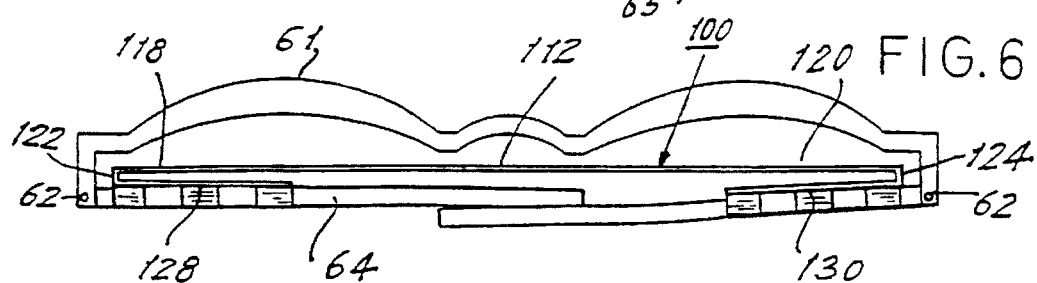
FIG. 6 is a top view of FIG. 5.
Figure 7:
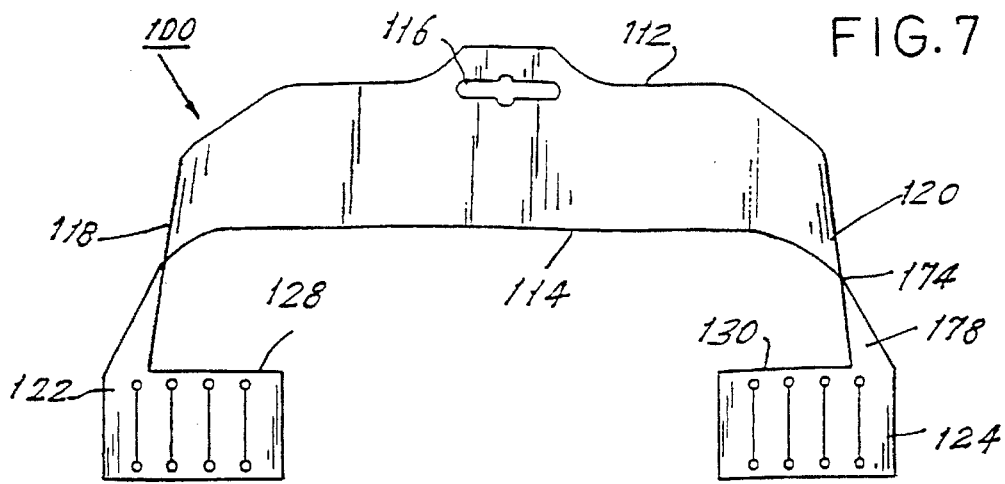
FIG. 7 shows the hanger without eyeglasses.
Figure 8:
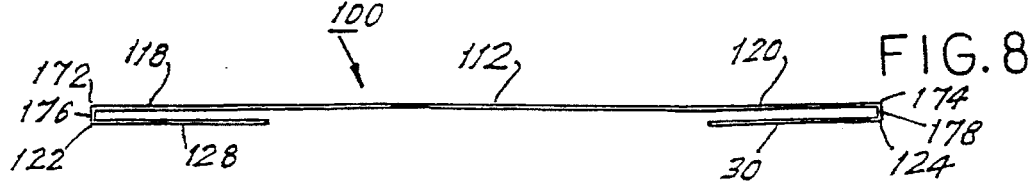
FIG. 8 is a top view of that hanger.

In the second embodiment of FIGS. 5–8 the hanger 100 has many of the elements of the hanger 10 of the first embodiment, and they are not further described. Similar items are identified by corresponding reference numerals raised by 100.

The primary change in the second embodiment as compared with the first is in the arms 118, 120. In the second embodiment, those arms extend down toward the hinges 122, 124, and the arms are bent there. But the arms have an intermediate bend at 172, 174, respectively, and those bends define intermediate arm panels 176, 178, respectively. Several results are realized here. First, unlike the first embodiment, because the arms are bent at the hinges 172, 174, with the temples 64 of the eyeglasses opened and the panels 128, 130 parallel to the temples, the arm panels 174, 176 extend front to rear, rather than laterally as in FIG. 3. As a result, the panels 176, 178 support the temple panels 128, 130, but do not block access though the lenses. This is an additional benefit over the previous embodiment.

As in the previous embodiment, the panels 128, 130 are out of the plane of the central portion and out of the plane of the arms 118, 176 and 120, 178. With this design, eyeglasses of different widths may be supported in the panel, without interference with the panels 176, 178 or with the hinges 122, 124.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hanger for supporting a pair of eyeglasses, wherein the eyeglasses include a pair of eyeglass lenses and foldable eyeglass temples hinged to the lenses and the temples being pivotable between a folded position over the lenses and an open position away from the lenses, the hanger comprising:

a central portion having a bottom edge generally above the lenses and having opposite lateral ends; means at the central portion by which the hanger may be supported and suspended;

a respective arm extending from each end of the central portion downward toward a respective one of the eyeglass temples, each arm being in a respective first plane;

a respective fixture panel for each temple including support means thereon for supporting the temple so that the support panel is movable as the temple is moved between its positions, each fixture panel being in a respective second plane which differs from the first plane of the respective arm for the panel; and a hinge connected between each fixture panel and the respective arm in the different first and second planes for enabling the panel to swing around the hinge along with the temple thereby supported.

2. The eyeglass hanger of claim 1, wherein with the eyeglass temples folded toward the lenses, the hanger hinge is closer to the hinge connection between the temple and the eyeglass lens while the support panel extends along the temple and away from the hinge connection.

3. The hanger of claim 1, wherein the support means on the panel hold the temple and the panel to extend parallel to each other as the temple and the panel pivot together around the eyeglass hinge.

4. The hanger of claim 1, wherein the support means of the panel comprise an opening through the support panel, through which the temple extends, thereby to connect the panel and the temple to pivot together.

5. The hanger of claim 1, wherein the support means of the panel comprise a plurality of openings through the panel, and the temple being threaded through the openings, to support the panel and the temple to pivot together.

6. The hanger of claim 5, wherein the panel is comprised of flexible yet resilient material, such that the temple may be threaded through the openings in the support panel, yet the material of the panel is stiff and resilient enough to hold the respective temple.

7. The hanger of claim 1, wherein the entire hanger including the central portion, the arms, the panels and the hinges is formed from a single piece of material which is bendable at the hinges for permitting the panels to pivot with the eyeglass temples.

8. The hanger of claim 1, wherein the hanger is free of elements of the hanger being on a bridge between the lenses of the eyeglasses.

9. The hanger of claim 1, wherein the arms are of sufficient length that the bottom of the central portion is shaped Go be above the lenses of the eyeglasses.

10. The hanger of claim 9, wherein when the panels are on the temples, the arms of the hanger are adapted to extend between the eyeglass temples and the eyeglass lenses, and the hinge being of a length to enable the panels to pivot with reference to the hanger arms.

11. The hanger of claim 1, wherein the means for supporting the hanger comprises an opening through the central portion of the hanger for receiving a display support.

12. The eyeglass hanger of claim 1, wherein each of the arms has an intermediate hinge connection therealong for dividing the arm between an upper portion toward the central portion and a lower portion toward the fixture panel; the arm being folded at the intermediate hinge connection and the panel being folded from the arm at the first mentioned hinge connection, whereby there are two hinge connections between the central portion and each of the panels.

13. The hanger of claim 12, wherein the upper portion of the arm toward the central portion is generally in the plane of the central portion, the lower portion of the arm between the first and intermediate hinge connection is normally in a second plane bent from the plane of the central portion and the fixture panels are in a further plane that is bent from the second plane of the lower portion of the arms.

\* \* \* \* \*